Patented Jan. 4, 1938

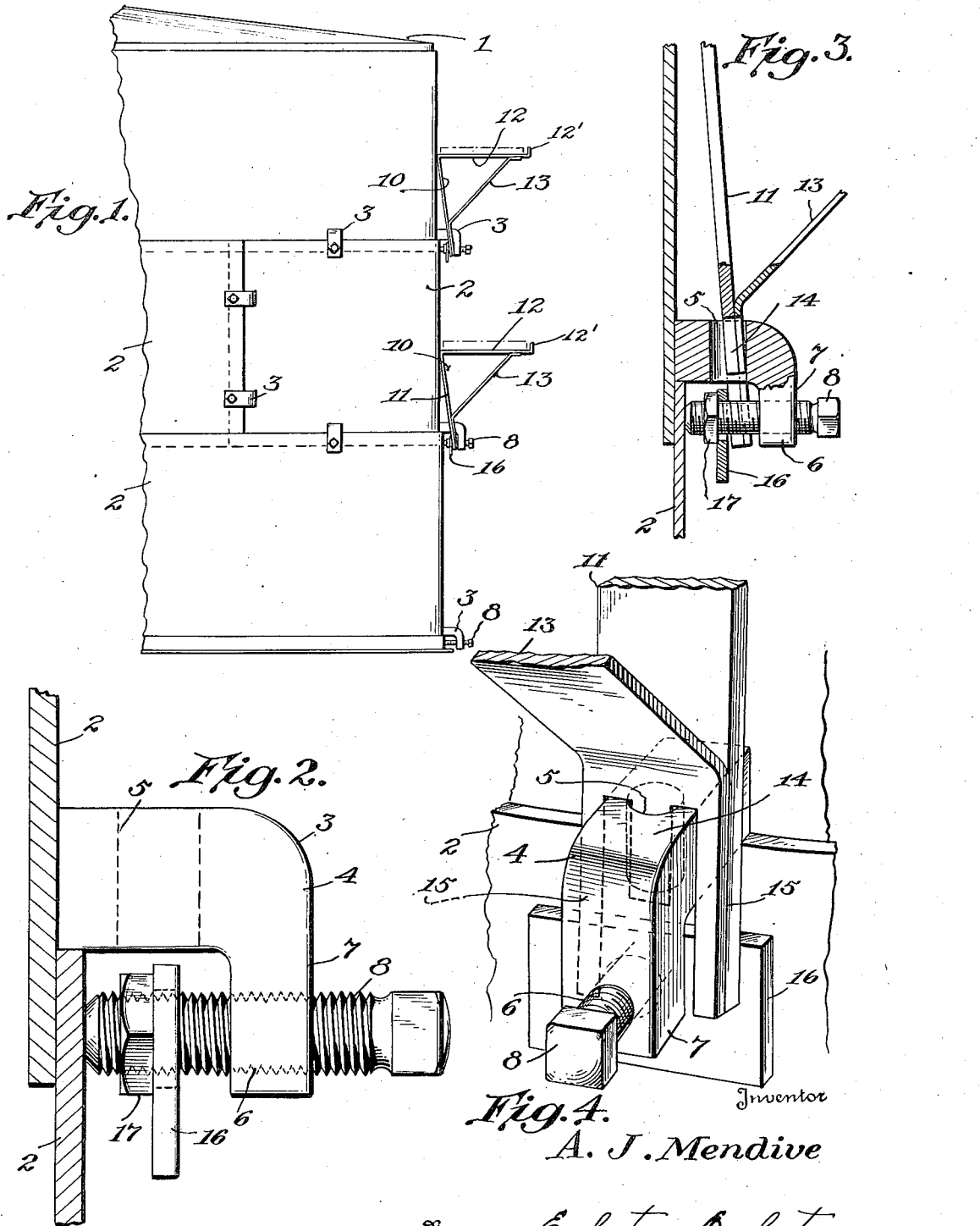

2,104,622

UNITED STATES PATENT OFFICE 2,104,622

CLAMP AND SCAFFOLD FOR WELDING OPERATIONS

Anthony Joseph Mendive, Houston, Tex.

Application May 5, 1936, Serial No. 78,021

6 Claims. (Cl. 113—99)

This invention relates to the erection of steel structures such as tanks, chimneys, ships and the like which are constructed of metal plates welded, riveted or bolted together at the building site.

One of the primary objects of the invention consists of a clamping device for securely and tightly clamping the plates together while they are being operated upon by the welding crew or the like in permanently uniting the plates.

Another object of the invention consists in the provision of a clamping device which will temporarily hold the plates in the desired condition of curvature prior to the application of the permanent attaching means, thereby eliminating the need of mechanically bending the plates prior to hoisting them into position.

A further object of the invention resides in providing a simple and inexpensive support for a platform or scaffold for use by the workmen during the welding, riveting or bolting operations to be performed upon the plates.

Other objects and advantages of the invention will be apparent from the following description when taken in connection with the accompanying drawing, in which, Figure 1 is a fragmentary view of a tank showing the novel clamps securing the plates temporarily in place and also showing some of the scaffold supports mounted on the clamps.

Figure 2 is a fragmentary sectional view through two adjoining plates with the cooperating clamp shown in side elevation.

Figure 3 is a view similar to Figure 2 showing a clamp and a portion of the scaffold support in section, and Figure 4 is a fragmentary perspective view of a clamp and scaffold support.

Referring to the drawing in more detail, the numeral 1 indicates generally a tank or the like which is to be constructed from a plurality of steel plates 2, while the numeral 3 indicates the clamping devices for securing the plates in position prior to welding.

Each clamp 3 comprises an angle member 4 having a hole 5 bored through one arm and a threaded opening 6 formed in the other arm. The opening 6 is formed in the downwardly extending arm 7 of the angle member and is adapted to receive a threaded bolt 8. The inner end of the bolt 8 is caused to engage a face of the adjacent plate and, in cooperation with the clamp member 3 which is secured to the other plate, causes the two plates to be securely clamped together during the welding operation as will be more fully described hereinafter. This clamping method eliminates the step of pre-shaping the plates prior to hoisting them into position.

In order to provide a simple and inexpensive scaffold support for the workmen, the clamps 3, especially those used for securing the horizontal edges of the plates, are formed with the vertical openings 5 to receive the lower ends of platform-supporting brackets. These brackets are indicated generally by the numeral 10 and each comprises a strip of metal bent into substantially the form of a right angle to provide a vertical leg 11 and a horizontal leg 12. These legs are preferably reinforced by a brace 13 which has its respective ends welded or otherwise secured to the legs.

The lower end of the leg 11 of the bracket is provided with a pair of parallel slots to provide a central tongue 14 and side tongues 15. The tongue 14 is adapted to be received in the aperture 5 of the clamp member 3, and the tongues 15 are adapted to straddle this member as indicated in Figure 4. A plate 16 and nut 17 threaded on bolt 8 cooperate with the lower ends of tongues 15 to firmly clamp the bracket in place.

In the operation of the device the clamp members 3 are welded to the various plates prior to hoisting the plates into position to be welded or otherwise secured to the other plates already in position on the structure. The clamps 3 are welded to the selected plates adjacent the edges thereof and the distance of the clamps from the edge depends upon the amount of overlap desired between the plates. In Figures 2, 3 and 4 a clamp is shown attached to the horizontal lower edge of a plate and it will be noted that the clamp rests on the upper edge of the plate below thus providing a temporary support for the plate. Two or more of these clamps are secured to the lower edge of each plate, and others are secured to the vertical edges.

Prior to raising the plates into position the bolts 8 are threaded into the openings 6 and the clamping plates 16 and nuts 17 are mounted thereon, and the tongues 14 of brackets 10 are inserted in the holes 5 of the clamps which are secured adjacent the lower edges of the plates. After the plates are hoisted to position the bolts 8 are tightened up as shown in Figures 2 and 3 so as to securely clamp the plates together. The nuts 17 are then tightened so as to press the plate 16 against the legs 15 of the brackets 10 thereby firmly securing the brackets in place. Boards or planks may then be placed on the horizontal arms 12 of the brackets as shown in dotted lines in Figure 1, and the outer ends of the arms are provided with upturned retaining fingers 12' to prevent lateral movement of the temporary platforms.

After the planks have served their purpose as a platform for the workmen in the welding operation they are removed and the brackets 10 are also dismounted after loosening up on the nuts 17. The clamps 3 may then be removed for use on other plates, or such of them as are mounted on the horizontal edges of the plates may be left in position for re-installing the brackets 10 from time to time for painting or repairing the tank or other structure.

The term welding as used herein is intended to include the various special types of welding such as butt welding, etc.

From the foregoing description and attached drawing it will be apparent that I have devised an exceedingly simple and inexpensive clamping device for structural plates; that they greatly facilitate the temporary mounting and clamping of the plates in position prior to the welding operation; that they eliminate the step of pre-shaping the plates; and that they are so designed as to provide a novel and practical arrangement of scaffolding during the operation of securing the plates, and one which is readily removed for re-use at minimum expense.

In accordance with the patent statutes I have described what I now believe to be the preferred form of the invention, but inasmuch as various minor changes may be made in the details of construction without departing from the spirit of the invention, it is intended that such changes be included within the scope of the appended claims.

What is claimed is:

1. A temporary clamp and scaffold support for tank plates or the like, including an angle member adapted to have one of its arms welded to a plate adjacent an edge thereof and having its other arm located in a plane parallel to the plane of the plate, the first-mentioned arm provided with an aperture, a bracket having a tongue adapted to seat in said aperture and laterally-spaced tongues adapted to straddle said arm and extend beyond the same, a clamping bolt threaded into the second-mentioned arm and provided with means for engaging the laterally spaced tongues.

2. A device of the character described, including a plurality of spaced clamps each having an arm attached to a plate to be welded or otherwise secured to a curved plate already in fixed position, said arms adapted to rest on the curved plate and thereby support the new plate, said clamps adapted to make the new plate conform to the curvature of the fixed plate, each of said arms having an aperture, and brackets removably mounted in said apertures for supporting a scaffold.

3. A device of the character described, including a plurality of spaced clamps each having an arm attached to a plate to be welded or otherwise secured to a curved plate already in fixed position, said arms adapted to rest on the curved plate and thereby support the new plate, an arm projecting from each of the first-mentioned arms, a bolt threaded through each of the second-mentioned arms and adapted to engage the plate already in position, whereby the new plate may be made to conform to the curvature of the fixed plate for the purpose of welding or the like, a bracket associated with each clamp for supporting a scaffold, each of the first-mentioned arms having an aperture, a portion of said brackets passing through said apertures into cooperative relation with said bolts, and nuts on the bolts for securing the brackets in position.

4. A device of the character described, including a plurality of spaced clamps, each having an arm attached to a plate to be welded or otherwise secured to a plate already in fixed position, said arms adapted to rest on the plate and thereby support the new plate, said clamps adapted to make the new plate conform to the fixed plate, each of said arms having an aperture, and brackets removably mounted in said apertures for supporting a scaffold.

5. A device of the character described, including a plurality of spaced clamps, each having an arm attached to a plate to be welded or otherwise secured to a plate already in fixed position, said arms adapted to rest on the plate and thereby support the new plate, an arm projecting from each of the first-mentioned arms, a bolt threaded through each of the second-mentioned arms and adapted to engage the plate already in fixed position, whereby the new plate may be made to conform to the fixed plate for the purpose of welding or the like, and a bracket associated with each of said bolts, said brackets adapted to support a scaffold.

6. A device of the character described, including a plurality of spaced clamps each having an arm attached to a plate to be welded or otherwise secured to a plate already in fixed position, said arms adapted to rest on the plate and thereby support the new plate, an arm projecting from each of the first-mentioned arms, a bolt threaded through each of the second-mentioned arms and adapted to engage the plate already in position, whereby the new plate may be made to conform to the fixed plate for the purpose of welding or the like, a bracket associated with each clamp for supporting a scaffold, each of the first-mentioned arms having an aperture, a portion of said brackets passing through said apertures into cooperative relation with said bolts, and nuts on the bolts for securing the brackets in position.

ANTHONY JOSEPH MENDIVE.